(12) United States Patent
Oh

(10) Patent No.: US 7,441,502 B2
(45) Date of Patent: Oct. 28, 2008

(54) PRINTING APPARATUS AND METHOD FOR FORMING PATTERNS FOR LIQUID CRYSTAL DISPLAY DEVICE USING THE SAME

(75) Inventor: Tae Young Oh, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 224 days.

(21) Appl. No.: 11/477,784

(22) Filed: Jun. 30, 2006

(65) Prior Publication Data

US 2007/0153043 A1 Jul. 5, 2007

(30) Foreign Application Priority Data

Dec. 30, 2005 (KR) .................. 10-2005-0135714

(51) Int. Cl.
*B41J 35/00* (2006.01)
(52) U.S. Cl. .................. 101/425; 101/424
(58) Field of Classification Search .......... 101/425, 101/424
See application file for complete search history.

(56) References Cited

U.S. PATENT DOCUMENTS 6,457,408 B1 * 10/2002 Yanagisawa et al. ....... 101/170
7,140,296 B2 * 11/2006 Baek et al. .................. 101/170
7,312,094 B2 * 12/2007 Yi et al. ........................ 438/30
7,331,286 B2 * 2/2008 Baek et al. .................. 101/170
2004/0123753 A1 7/2004 Yoo et al.

FOREIGN PATENT DOCUMENTS

| EP | 0 147 199 A2 | 7/1985 |
|---|---|---|
| JP | 63-004948 | 1/1988 |
| JP | 03-004948 A | 1/1991 |
| JP | 6-143858 A | 5/1994 |

* cited by examiner

*Primary Examiner*—Anthony H. Nguyen
(74) *Attorney, Agent, or Firm*—Holland & Knight LLP

(57) ABSTRACT

A printing apparatus includes at least one printing nozzle for applying a material, at least one first printing plate, at least one second printing plate, at least one printing roll for transcribing a portion of the pattern material on one of a first substrate and a second substrate, the transcribed portion of the pattern material corresponding to an engraving in one of the first and second printing plates, and a washer unit for washing one of the first and second printing plates while the printing roll transcribing the pattern material.

18 Claims, 12 Drawing Sheets

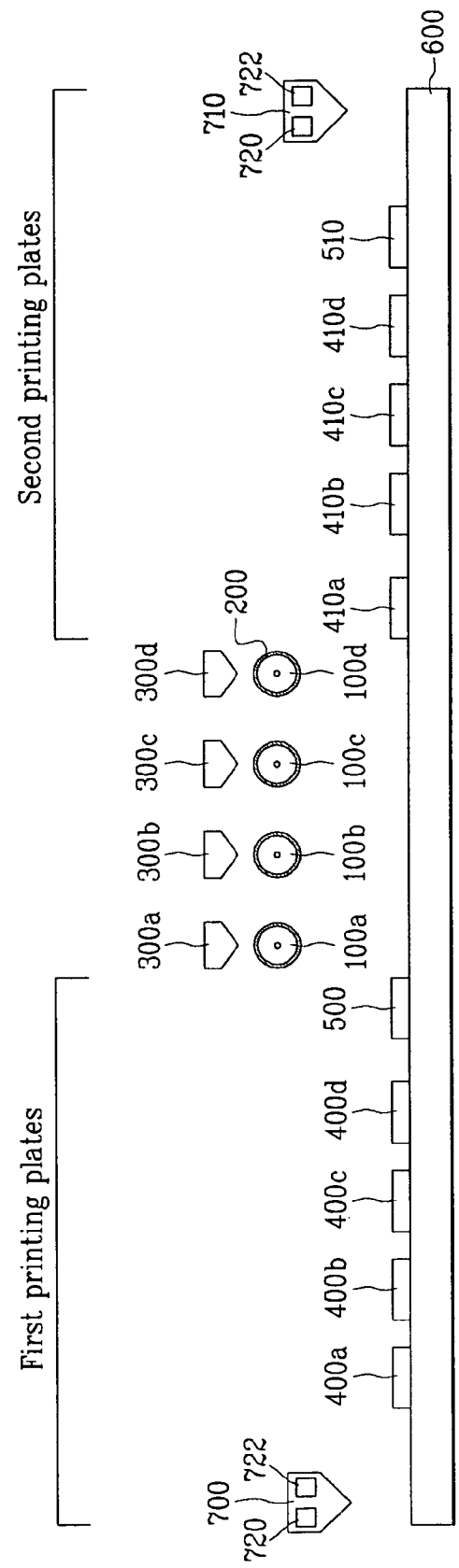

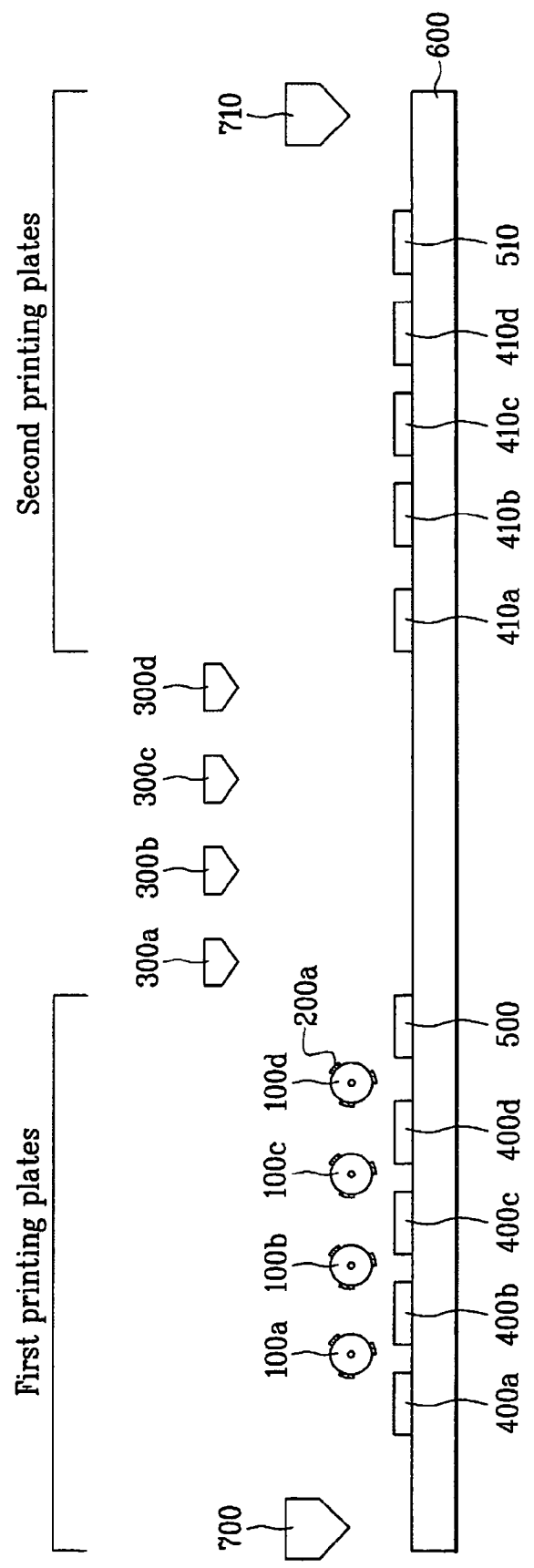

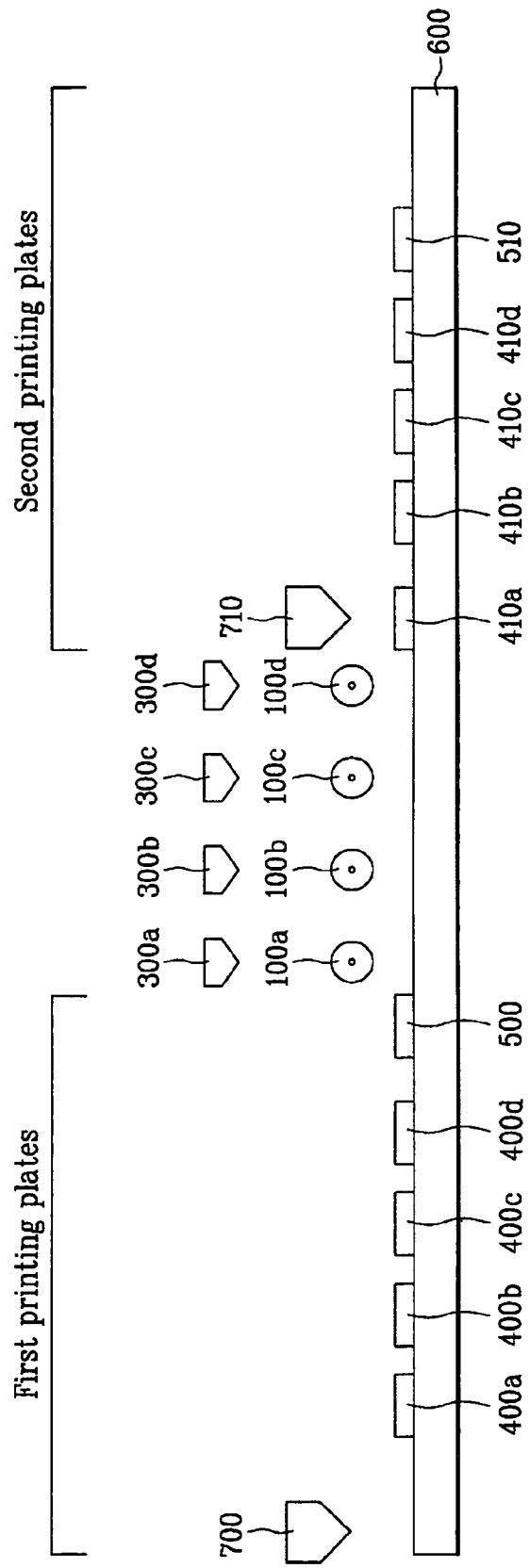

FIG. 4

| First step | Second step | Third step | Fourth step |
|---|---|---|---|
| Coat | Form patterns | Transcribe patterns | Move printing rolls |

0    11              40              76    90

PRINTING APPARATUS AND METHOD FOR FORMING PATTERNS FOR LIQUID CRYSTAL DISPLAY DEVICE USING THE SAME

The present invention claims the benefit of Korean Patent Application No. 10-2005-0135714 filed in Korea on Dec. 30, 2005, which is hereby incorporated by reference in its entirety.

BACKGROUND OF THE INVENTION

1. Field of the Invention

The present invention relates to a display device, and more particularly, to a printing apparatus for manufacturing a liquid crystal display device and a method for forming patterns using the same.

2. Discussion of the Related Art

Among ultra-thin flat panel display devices having a thickness of a few tens of centimeters, liquid crystal display devices have a low operating voltage, low power consumption and are portable. Thus, liquid crystal display devices are widely used in various fields, such as monitors in notebook computers, space shuttles, and aircraft.

A liquid crystal display device includes a lower substrate, an upper substrate, and a liquid crystal layer formed between both substrates. The lower substrate includes gate wires and data wires, which cross each other to define pixel regions, formed thereon. Thin film transistors (TFTs) serving as switching elements are formed at the crossings of the gate wires and the data wires. Further, pixel electrodes are formed on the lower substrate, and are connected to the TFTs.

A shading layer for preventing light leakage at the gate wires, the data wires, and the TFT regions is formed on the upper substrate, and a color filter layer is formed on the shading layer, and a common electrode is formed on the color filter layer.

Manufacturing a liquid crystal display device includes various processes that are repeatedly performed. In general, to pattern the components, a general photolithography process is used. In the photolithography process, a pattern material layer is formed on a substrate, and a photosensitive film is stacked on the pattern material layer. Then, a mask having a designated pattern is located on the photosensitive film, and the photosensitive film is patterned to a shape corresponding to the mask by exposure and development. Thereafter, the pattern material layer is etched using the patterned photosensitive film as a mask.

The above photolithography process uses the photosensitive film and the mask having a designated pattern, thus increasing the production costs of the liquid crystal display device. Further, the photolithography process includes the development and the etching. Thus the photolithography process is complicated and takes a long time.

Accordingly, to solve the above drawbacks of the photolithography process, an alternative method for forming a pattern has been developed. For example, a method for forming a pattern using a printing roll has been proposed.

FIGS. 1A to 1C are cross-sectional views illustrating a printing process for forming a set of patterns on a substrate according to the related art. As shown in FIG. 1A, a pattern material 20 is applied to a printing roll 10 using a printing nozzle 30.

As shown in FIG. 1B, the printing roll 10, to which the pattern material 20 is applied, is applied to a printing plate 40, in which a designated figure is engraved. Then, a part 20b of the pattern material 20 is transcribed on protrusions of the printing plate 40, and the other part 20a of the pattern material 20 remains on the printing roll 10.

As shown in FIG. 1C, the printing roll 10 having the remaining pattern material 20a then is rotated on a substrate 50, thereby transcribing the remaining pattern material 20a on the substrate 50.

As described above, a pattern formed using the printing roll 10 requires the printing plate 40. However, to pattern various components of a liquid crystal display device into various shapes, the method as shown in FIGS. 1A to 1C using one printing roll and one printing plate takes a long time. Thus, a four-color printing apparatus for forming red, green and blue color filter layers and a black matrix layer has been proposed.

FIGS. 2A to 2D are cross-sectional views illustrating a printing process for forming four sets of patterns according to the related art. As shown in FIG. 2A, pattern materials 20 are respectively applied to printing rolls 10a, 10b, 10c, and 10d using printing nozzles 30a, 30b, 30c, and 30d.

As shown in FIG. 2B, the printing rolls 10a, 10b, 10c, and 10d, to which the pattern materials 20 are applied, move to respectively rotate on printing plates 40a, 40b, 40c, and 40d. The printing plates 40a, 40b, 40c and 40d are placed on a stage 60.

Although not shown in FIGS. 2A to 2D, designated figures corresponding to patterns to be formed are respectively engraved in the printing plates 40a, 40b, 40c, and 40d, as shown in FIG. 1B. Then, one part of the pattern material 20 applied to each of the printing rolls 10a, 10b, 10c, and 10d is transcribed on protrusions of the corresponding one of the printing plates 40a, 40b, 40c, and 40d, and the other part of the pattern material 20 applied to each of the printing rolls 10a, 10b, 10c, and 10d remains on the corresponding one of the printing rolls 10a, 10b, 10c, and 10d.

Thereafter, as shown in FIG. 2D, the printing rolls 10a, 10b, 10c, and 10d are sequentially rotated on a substrate 50, thereby sequentially transcribing the remaining pattern materials 20a of the printing rolls 10a, 10b, 10c, and 10d on the substrate 50. Accordingly, a pattern is formed on the substrate 50 using the printing roll 10.

As described above, the four-color printing apparatus forms four patterns by a single process, thereby shortening an overall process time. However, since the pattern materials 20b respectively remain on the protrusions of the printing plates 40a, 40b, 40c, and 40d after one printing process is completed, the engraving on the printing plates 40a, 40b, 40c and 40d deteriorates for a next printing process

SUMMARY OF THE INVENTION

Accordingly, the present invention is directed to a printing apparatus and a method for forming patterns for a liquid crystal display device using the same that substantially obviate one or more problems due to limitations and disadvantages of the related art.

An object of the present invention is to provide a printing apparatus, and a method for forming patterns of a liquid crystal display device using the same in which printing plates do not deteriorate for the next printing.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a printing apparatus includes at least one printing nozzle for applying a material, at least one first printing plate, at least one second printing plate, at least one printing roll for transcribing a portion of the pattern material on one of a first substrate and a second substrate, the transcribed portion of the pattern material corresponding to an engraving in one of the first and second printing plates, and a washer unit for washing one of the first and second printing plates while the printing roll transcribing the pattern material.

In another aspect of the present invention, a method for forming a liquid crystal display device includes forming a patterned material on a printing roll using one of a first printing plate and a second printing plate, transcribing the patterned material on the printing roll onto one of a first substrate and a second substrate, and washing one of the first and second printing plates while forming the patterned material or transcribing the patterned material.

In yet another aspect of the present invention, a method for forming a liquid crystal display device includes forming a first patterned material on a printing roll using a first printing plate, transcribing the first patterned material on the printing roll onto a first substrate, forming a second patterned material on the printing roll using a second printing plate, transcribing the second patterned material on the printing roll onto a second substrate, and washing the first printing plate while forming the second patterned material or transcribing the second patterned material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 3A to 3G are cross-sectional views illustrating a printing apparatus and a process for forming multiple sets of patterns in accordance with an embodiment of the present invention;

FIG. 4 is a schematic view illustrating timing of the process shown in FIGS. 3A to 3G in accordance with an embodiment of the present invention.

DETAILED DESCRIPTION OF THE PREFERRED EMBODIMENTS

Reference will now be made in detail to preferred embodiments of the present invention, examples of which are illustrated in the accompanying drawings.

Figure 1A:
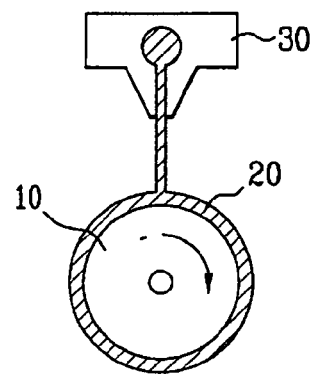
FIGS. 1A to 1C are cross-sectional views illustrating a printing process for forming a set of patterns on a substrate according to the related art.
Figure 1B:
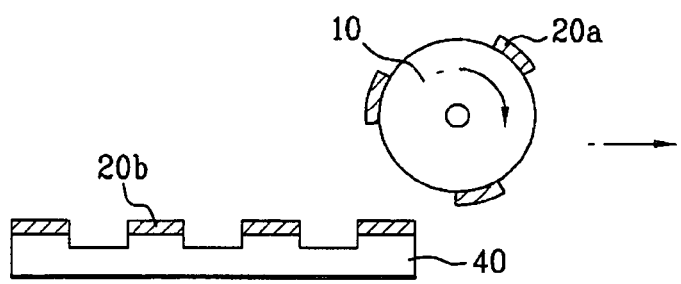
Figure 1C:
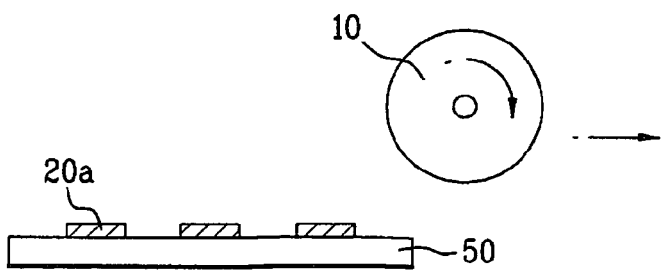
Figure 2A:
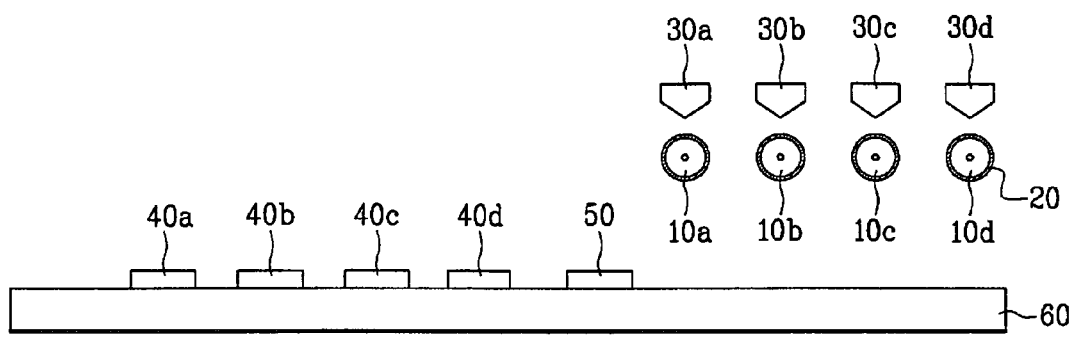
FIGS. 2A to 2D are cross-sectional views illustrating a printing process for forming four sets of patterns according to the related art.
Figure 2B:
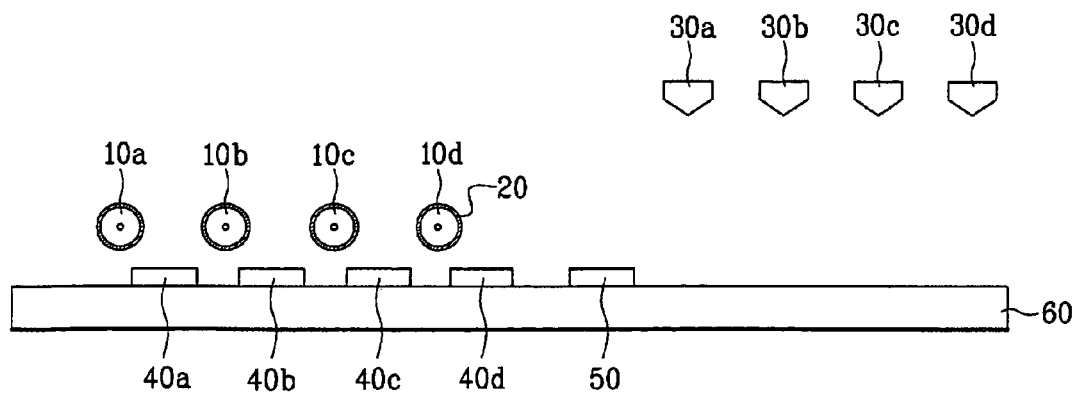
Figure 2C:
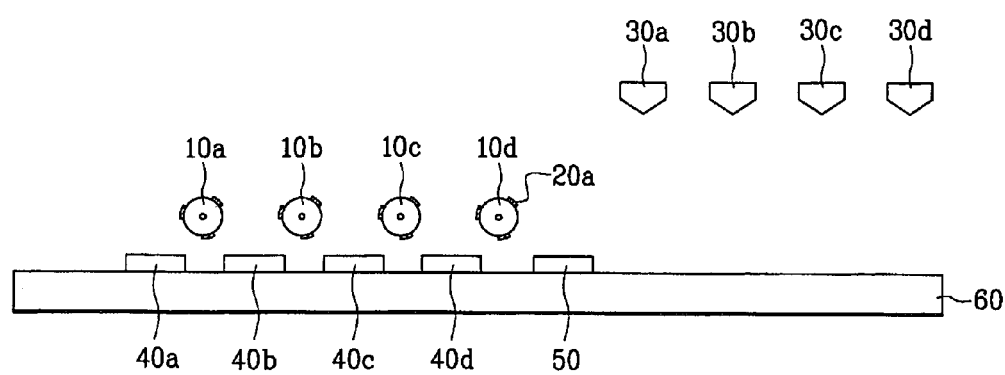
Figure 2D:
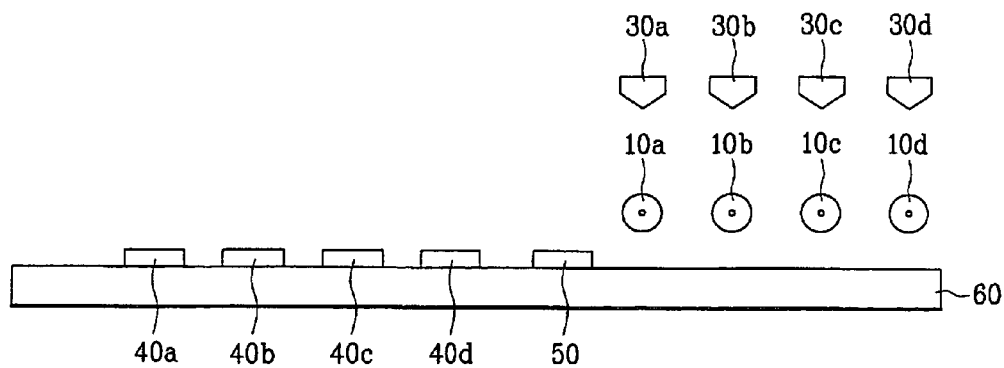
Figure 3B:
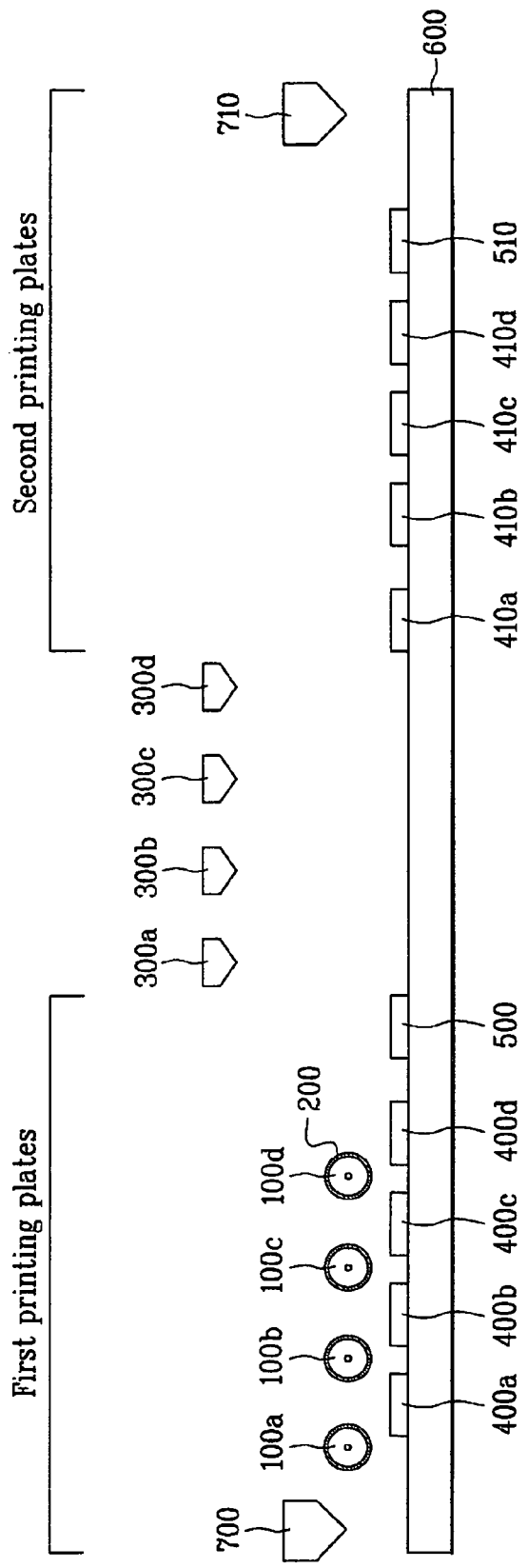

FIGS. 3A to 3G are cross-sectional views illustrating a printing apparatus and a process for forming multiple sets of patterns in accordance with an embodiment of the present invention. In FIG. 3A, a printing apparatus includes a first printing roll 100a, a second printing roll 100b, a third printing roll 100c, a fourth printing roll 100d, a first printing nozzle 300a, a second printing nozzle 300b, a third printing nozzle 300c, and a fourth printing nozzle 300d. The printing apparatus also includes a stage 600 holding two sets of printing plates. The first set of printing plates includes a first printing plate 400a, a second printing plate 400b, a third printing plate 400c, and a fourth printing plate 400d, and the second set of printing rolls includes a fifth printing plate 410a, the sixth printing plate 410b, the seventh printing plate 410c and the eighth printing plate 410d.

The printing nozzles 300a, 300b, 300c and 300d are placed above the stage 600. In particular, the printing nozzles 300a, 300b, 300c and 300d may be placed corresponding to a center region of the stage 600, and the first and second sets of printing plates may be placed on different sides of the printing nozzles 300a, 300b, 300c and 300d.

The stage 600 may hold a first substrate 500 to form patterns thereon on one side of the printing nozzles 300a, 300b, 300c and 300d and may hold a second substrate 510 to form patterns thereon on a different side of the printing nozzles 300a, 300b, 300c and 300d. For example, the first substrate 500 may be placed adjacent to the first set of printing plates 400a, 400b, 400c and 400d and the second substrate 510 may be placed adjacent to the second set of printing plates 410a, 410b, 410c and 410d. Although not shown, the first set of printing plates 400a, 400b, 400c, and 400d are respectively engraved to correspond to the patterns to be formed on the first substrate 500, and the second set of printing plates 410a, 410b, 410c and 410d are respectively engraved to correspond to the patterns to be formed on the second substrate 510.

The printing apparatus also includes a first washer 700 for washing the first set of printing plates 400a, 400b, 400c, and 400d, and a second washer 710 for washing the second set of printing plates 410a, 410b, 410c and 410d. The first printing roll 100a, the second printing roll 100b, the third printing roll 100c and the fourth printing roll 100d, the first washer 700 and the second 710 are movably installed above the stage 600. Each of the first and second washers 700 and 710 may include a washing solution spraying unit 720 and a drying unit 722.

In a printing processing according to an embodiment of the present invention, the printing rolls 100a, 100b, 100c and 100d first move to be arranged in proximity to the printing nozzles 300a, 300b, 300c and 300d, respectively. Then, the first printing nozzle 300a, the second printing nozzle 300b, the third printing nozzle 300c and the fourth printing nozzle 300d respectively dispense patterning materials 200 on the first printing roll 100a, the second printing roll 100b, the third printing roll 100c and the fourth printing roll 100d. For example, the first printing nozzle 300a may dispense a blue color filter material onto the first printing roll 100a, the second printing nozzle 300b may dispense a green color filter material onto the second printing roll 100b, the third printing nozzle 300c may dispense a red color filter material onto the third printing roll 100c, and the fourth printing nozzle 300d may dispense a black color filter material onto the fourth printing roll 100d. Accordingly, the engraving on the printing plate that is the closest to the substrate 500 is first transcribed onto the substrate 500.

As shown in FIG. 3B, the first printing roll 100a, the second printing roll 100b, the third printing roll 100c and the fourth printing roll 100d having the pattern materials 200 thereon are moved to be proximity to the first set of printing plates 400a, 400b, 400c, and 400d. Although not shown, each of the first printing roll 100a, the second printing roll 100b, the third printing roll 100c and the fourth printing roll 100d then respectively contacts with and rotates on the first printing plate 400a, the second printing plate 400b, the third printing plate 400c, and the fourth printing plate 400d.

As shown in FIG. 3C, due to the engraving on the first set of printing plates 400a, 400b, 400c and 400d, remnants of the pattern materials 200a remain on the printing rolls 100a, 100b, 100c and 100d after their respective contact with the first printing plate 400a, the second printing plate 400b, the third printing plate 400c and the fourth printing plate 400d. Then, the fourth printing roll 100d, the third printing roll 100c, the second printing roll 100b and the first printing roll 100a sequentially rotate on the first substrate 500 to transcribe the remaining pattern materials 200a thereon. For example, the printing rolls 100a, 100b, 100c and 100d may be independently controlled, such that the fourth printing roll 100d first contacts and rotates on the first substrate 500, the third printing roll 100d then rotates on the first substrate 500, and so on with the second and first printing rolls 100b and 100a. As a result, specific patterns of the pattern materials 200, such as a black matrix layer, a red color filter layer, a green color filter layer and a blue color filter layer, are formed on the first substrate 500. In particular, the patterns formed on the first substrate 500 correspond to the engraving of the first set of printing plates 400a, 400b, 400c and 400d.

Figure 3D:
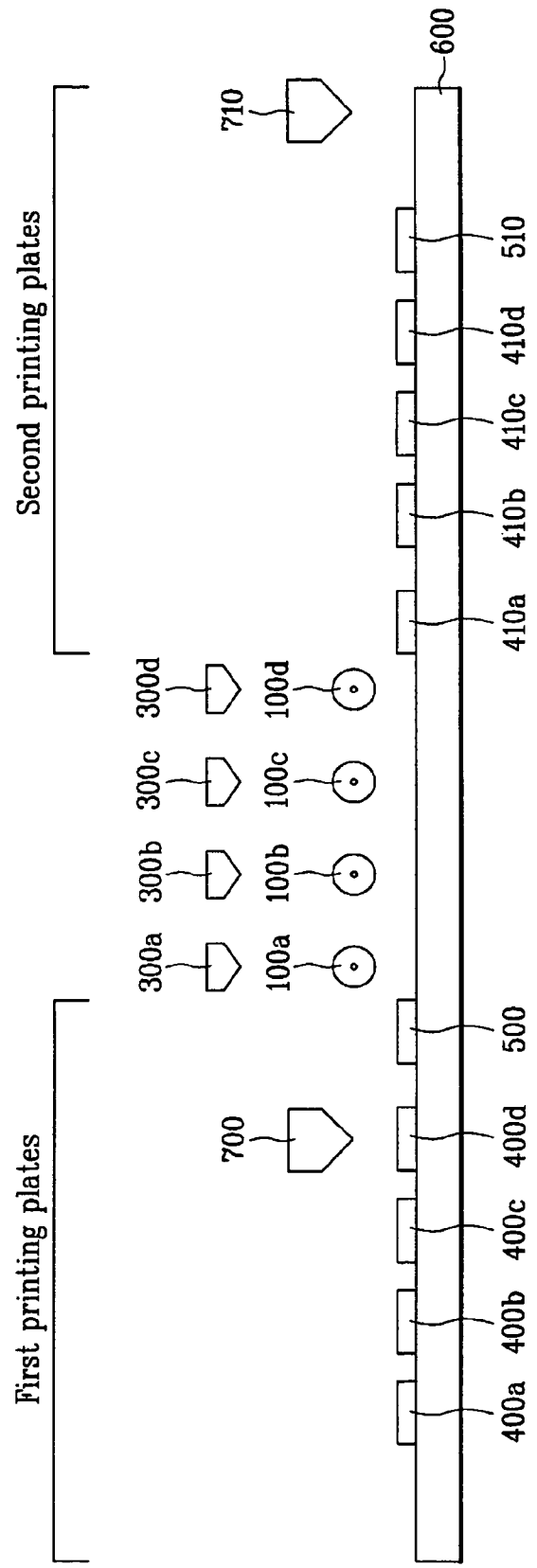

As shown in FIG. 3D, the first washer 700 then moves above the first set of printing plates 400a, 400b, 400c and 400d to respectively clean the first set of printing plates 400a, 400b, 400c and 400d. As a result, the engraving on the first set of printing plates 400a, 400b, 400c and 400d is clearly defined for the next printing process.

At the same time, the printing rolls 100a, 100b, 100c and 100d may be moved to be arranged in proximity to the printing nozzles 300a, 300b, 300c and 300d, respectively. Then, the first printing nozzle 300a the second printing nozzle 300b, the third printing nozzle 300c and the fourth printing nozzle 300d respectively dispense another set of patterning materials 200 on the first printing roll 100a, the second printing roll 100b, the third printing roll 100c and the fourth printing roll 100d.

Figure 3E:
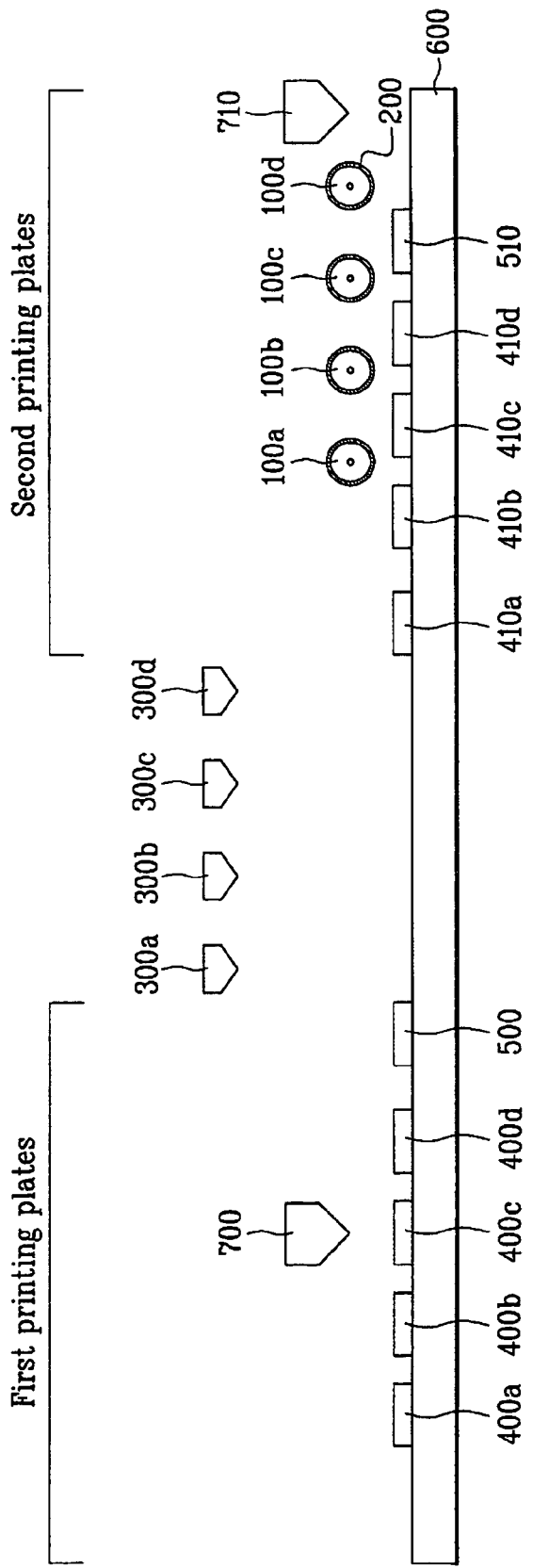

As shown in FIG. 3E, the first printing roll 100a, the second printing roll 100b, the third printing roll 100c and the fourth printing roll 100d having the pattern materials 200 thereon may be moved to be proximity to the second set of printing plates 410a, 410b, 410c, and 410d, while the first washer 700 cleans the first set of printing plates 400a, 400b, 400c and 400d. Although not shown, each of the first printing roll 100a, the second printing roll 100b, the third printing roll 100c and the fourth printing roll 100d then respectively contacts with and rotates on the fifth printing plate 410a, the sixth printing plate 410b, the seventh printing plate 410c, and the eighth printing plate 410d.

Figure 3F:
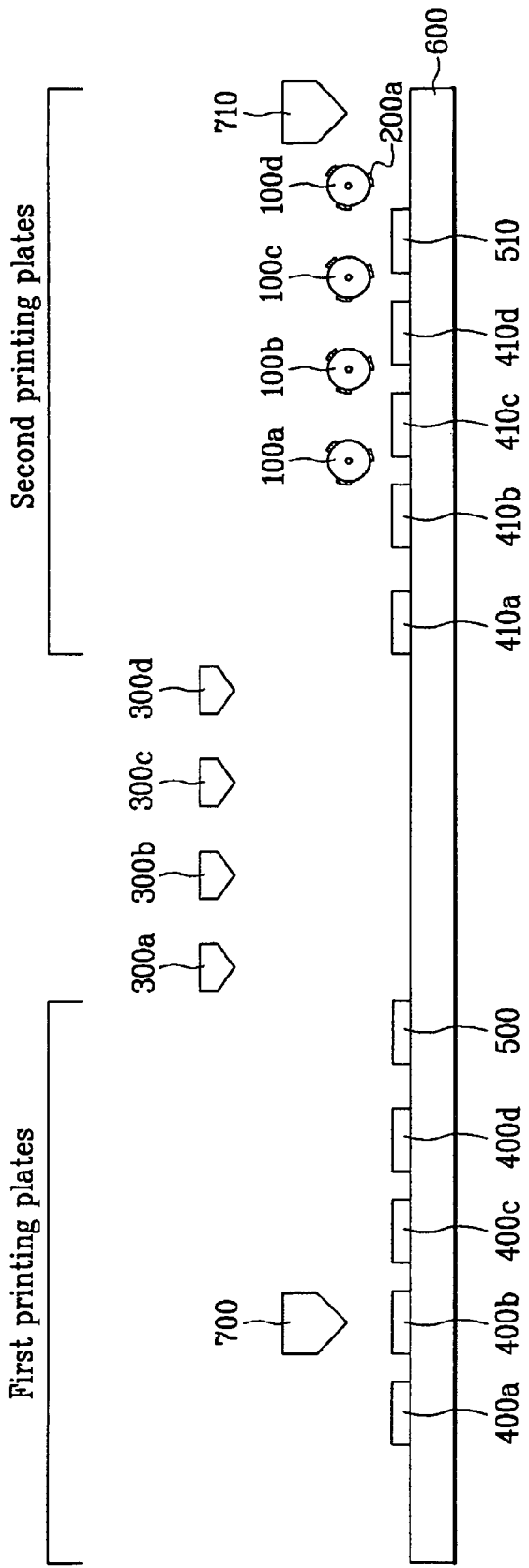

As shown in FIG. 3F, due to the engraving on the second set of printing plates 410a, 410b, 410c and 410d, specific amounts of the pattern materials 200a remain on the printing rolls 100a, 100b, 100c and 100d after their respective contact with the fifth printing plate 410a, the sixth printing plate 410b, the seventh printing plate 410c and the eighth printing plate 410d. Then, the fourth printing roll 100d, the third printing roll 100c, the second printing roll 100b and the first printing roll 100a sequentially rotate on the second substrate 510 to transcribe the remaining pattern materials 200a thereon. For example, the printing rolls 100a, 100b, 100c and 100d may be independently controlled, such that the fourth printing roll 100d first contacts and rotates on the second substrate 510, the third printing roll 100d then rotates on the second substrate 510, and so on with the second and first printing rolls 100b and 100a. As a result, specific patterns of the pattern materials 200, such as a black matrix layer, a red color filter layer, a green color filter layer and a blue color filter layer, are formed on the second substrate 510. The patterns formed on the second substrate 510 correspond to the engraving of the second set of printing plates 410a, 410b, 410c and 410d. In particular, the patterns may be formed on the second substrate 510 as the first washer 700 cleans the first set of printing plates 400a, 400b, 400c and 400d.

As shown in FIG. 3G, the second washer 710 then moves above the second set of printing plates 410a, 410b, 410c and 410d to respectively clean the second set of printing plates 410a, 410b, 410c and 410d. As a result, the engraving on the second set of printing plates 410a, 410b, 410c and 410d is clearly defined for the next printing process.

At the same time, the printing rolls 100a, 100b, 100c and 100d may be moved to be arranged in proximity to the printing nozzles 300a, 300b, 300c and 300d, respectively. Then, the first printing nozzle 300a, the second printing nozzle 300b, the third printing nozzle 300c and the fourth printing nozzle 300d respectively dispense another set of patterning materials 200 on the first printing roll 100a, the second printing roll 100b, the third printing roll 100c and the fourth printing roll 100d for another printing process.

FIG. 4 is a schematic view illustrating timing of the process shown in FIGS. 3A to 3G in accordance with an embodiment of the present invention. As shown in FIG. 4, a coating step FIRST STEP may take about 11 seconds, a pattern forming step SECOND STEP may take about 29 seconds, a pattern transcribing step THIRD STEP may take about 36 seconds, and a step of moving the printing rolls FOURTH STEP may take about 14 second. In addition, a printing plate cleaning process overlaps the step of moving the printing rolls FOURTH STEP and the coating step FIRST STEP. For example, assuming washing one printing plate requires 15 seconds, 60 seconds would be needed to carry out the cleaning step shown in FIG. 3D where the first washer 700 sequentially cleans the first set of printing plates 400a, 400b, 400c and 400d. The 60-second period for cleaning the first set of printing plates 400a, 400b, 400c and 400d may overlap the step of moving the printing rolls FOURTH STEP, the coating step FIRST STEP, the pattern forming step SECOND STEP, and the pattern transcribing step THIRD STEP. Accordingly, no idle period is needed for the printing rolls during the washer cleaning of the printing plates, thereby improving operation efficiency.

In particular, while the printing rolls 100a, 100b, 100c and 100d are moved above the plurality of second printing plates 410a, 410b, 410c, and 410d, the first washer 700 may wash the fourth printing plate 400d as shown in FIG. 3D. Further, while the patterning material 200 are dispensed on the printing rolls 100a, 100b, 100c and 100d, the first washer 700 may begin to wash the third printing plate 400c as shown in FIG. 3E. While the printing rolls 100a, 100b, 100c and 100d rotates on the second sets of printing plates 410a, 410b, 410c and 410d, the first washer 700 may continue to wash the third printing plate 400c, may wash the second printing plate 400b and may begin to wash the first printing plate 400a, as shown in FIG. 3F. As the patterns are formed on the second substrate 510, the first washer 700 may continue to wash the first printing plate. Accordingly, the first washer 700 may complete washing of the first set of printing plates 400a, 400b, 400c and 400d, while the patterns are formed on the second substrate 510.

In addition, assuming washing one printing plate requires 15 seconds, 60 seconds would be needed to carry out the cleaning step shown in FIG. 3G where the second washer 710 sequentially cleans the second set of printing plates 410a,

410b, 410c, and 410d. In particular, the 60-second period for cleaning the second set of printing plates 410a, 410b, 410c and 410d may overlap the step of moving the printing rolls FOURTH STEP, the coating step FIRST STEP, the pattern forming step SECOND STEP, and the pattern transcribing step THIRD STEP where the printing rolls 100a, 100b, 100c and 100d rotates on the first set of printing plates 400a, 400b, 400c and 400d and where the printing rolls 100a, 100b, 100c and 100d transcribes patterns on the first substrate 500. Accordingly, no idle period is needed for the printing rolls during the washer cleaning of the printing plates, thereby improving operation efficiency.

Although the washing order by the first washer 700 is shown to start with the fourth printing plate 400d, the washing order may be reversed. Similarly, although the washing order by the second washer 710 is shown to start with the fifth printing plate 401a, the washing order may be reversed. In addition, instead of installing both the first and second washers 700 and 710 above the stage 600, only one of the first and second washers 700 and 710 may be installed and such a washer may move on both sides of the printing nozzles 300a, 300b, 300c and 300d.

Figure 5A:
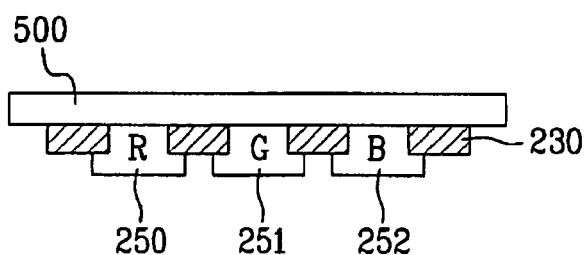
FIGS. 5A to 5C are cross-sectional views illustrating a process for manufacturing a liquid crystal display device using a printing apparatus according to an embodiment of the present invention.
Figure 5B:
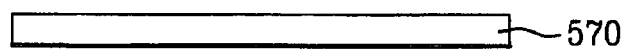
Figure 5C:
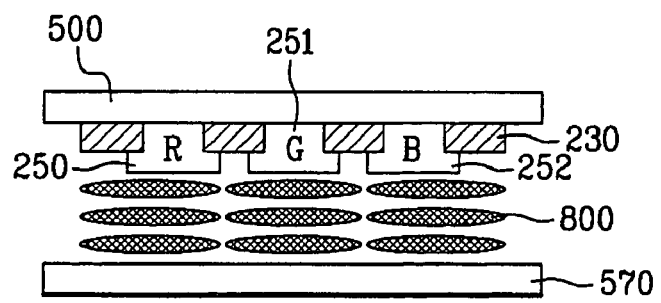

FIGS. 5A to 5C are cross-sectional views illustrating a process for manufacturing a liquid crystal display device using a printing apparatus according to an embodiment of the present invention. As shown in FIG. 5A, a black matrix layer 230, portions of which are regularly positioned, is printed on a first substrate 500. The black matrix layer 230 may be formed using the fourth printing roll 100d and the fourth printing plate 400d for example, shown in FIG. 3A. A red (R) color filter layer 250 also is printed on the first substrate 500 at a designated position. The red color filter layer 250 may be formed using the third printing roll 100c and the third printing plate 400c for example, shown in FIG. 3A. In addition, a green (G) color filter layer 251 is printed on the first substrate 500 at a designated position. The green color filter layer 251 may be formed using the second printing roll 100b and the second printing plate 400b, for example, shown in FIG. 3A. A blue (B) color filter layer 252 is printed on the substrate 500 at a designated position. The blue color filter layer 252 may be formed using the first printing roll 100a and the first printing plate 400a, for example, shown in FIG. 3A.

As shown in FIG. 5B, a second substrate 570 is prepared. Although not shown, the second substrate 570 can include gate wires and data wires, which cross each other to define pixel regions, thin film transistors (TFTs) respectively formed at the crossings of the gate wires and the data wires, and pixel electrodes connected to the TFTs.

As shown in FIG. 5C, a liquid crystal layer 800 is formed between the first substrate 500 and the second substrate 570. Although not shown, a sealant may be applied to one surface of one of the first and second substrates 500 and 570 without forming injection holes therethrough. Then, a designated amount of liquid crystal is applied to one of the first and second substrates 500 and 570. Subsequently, the first and second substrates 500 and 570 are bonded to each other. Alternatively, the sealant may be applied to one surface of one of the first and second substrates 500 and 570 while forming injection holes therethrough. Then, the first and second substrates 500 and 570 are bonded to each other. Subsequently, a designated amount of liquid crystal is injected through the injection holes using a capillary action and a difference of pressures.

Although four printing nozzles, four printing rolls and four printing plates are shown in FIGS. 3A to 3G, a printing apparatus according an embodiment of the present invention may include any number of printing nozzle, printing rolls and printing plates. For example, a printing apparatus according an embodiment of the present invention may include three printing nozzle. Alternatively, a printing apparatus according to another embodiment of the present invention may include five printing nozzles, five printing rolls, and five printing plates for printing five different materials, such as a red color filter material, a green color filter material, a blue color filter material, a white color filter material and a black color filter material, in one in-line process.

In addition, although first and second printing plates are shown in FIGS. 3A to 3G, a printing apparatus according to an embodiment of the present invention may include any number of printing plate sets. For example, a printing apparatus according to an embodiment of the present invention may include first, second and third printing plate sets, where each of the first, second and third printing plate sets includes one or more printing plates.

As described above, a printing apparatus and the method for manufacturing a liquid crystal display device using the same in accordance with an embodiment of the present invention have several advantages. For example, a printing apparatus according to an embodiment of the present invention has a plurality of printing rolls, a plurality of printing plates, and washers for washing the printing plates by an in-line processing method, thereby simplifying the washing process and shortening a washing time.

In addition, a printing apparatus according to another embodiment of the present invention has a plurality of printing plates and one substrate, which are disposed at each of both sides of a plurality of printing rolls. When patterns are formed on the substrate disposed at one side of the printing rolls, the printing plates disposed at the other side of the printing rolls are washed. Accordingly, the printing apparatus assures a sufficient time to wash the printing plates and is continuously operated, thereby stably increasing the operating rate. Further, the increased operating rate of the printing apparatus increases production yield, thereby reducing manufacturing cost.

It will be apparent to those skilled in the art that various modifications and variations can be made in the printing apparatus and the method for forming patterns for a liquid crystal display device using the same of the present invention without departing from the spirit or scope of the invention. Thus, it is intended that the present invention covers the modifications and variations of this invention provided they come within the scope of the appended claims and their equivalents.

What is claimed is:

1. A printing apparatus for forming a liquid crystal display device having a first substrate and a second substrate comprising:
   at least one printing nozzle for applying a pattern material;
   at least one first printing plate;
   at least one second printing plate;
   at least one printing roll for transcribing a portion of the pattern material on one of the first substrate and the second substrate, the transcribed portion of the pattern material corresponding to an engraving in one of the first and second printing plates; and
   a washer unit for washing one of the first and second printing plates while the printing roll transcribing the pattern material.

2. The printing apparatus as set forth in claim 1, further comprising at least one third printing plate.

3. The printing apparatus as set forth in claim 1, wherein the printing roll receives the pattern material from the printing nozzle, transcribes a first portion of the pattern material on one of the first printing plate and the second printing plate, and transcribes a remaining portion of the pattern material on one of the first substrate and a second substrate.

4. The printing apparatus as set forth in claim 1, wherein the first printing plate and the first substrate are on a first side of the printing nozzle, and the second printing plate and the second substrate are on a second side of the printing nozzle.

5. The printing apparatus as set forth in claim 1, wherein the washer unit comprises a spraying unit for spraying a washing solution to one of the first and second printing plates and a drying unit for drying one of the first and second printing plates.

6. The printing apparatus as set forth in claim 1, wherein the washer unit comprises at least two spraying units for respectively spraying a washing solution to the first and second printing plates and at least two drying units for drying the first and second printing plates.

7. The printing apparatus as set forth in claim 1, wherein the printing nozzles, the printing rolls, the first printing plates and the second printing plates respectively are the same number.

8. The printing apparatus as set forth in claim 1, wherein the transcribed portion of the pattern material forms one of a black matrix pattern, a red color filter pattern, a green color filter pattern, and a blue color filter pattern.

9. A method for forming a liquid crystal display device comprising:
    forming a patterned material on a printing roll using one of a first printing plate and a second printing plate;
    transcribing the patterned material on the printing roll onto one of a first substrate and a second substrate; and
    washing one of the first and second printing plates while forming the patterned material or transcribing the patterned material.

10. The method as set forth in claim 9, further comprising applying a pattern material on the printing roll using a nozzle.

11. The method as set forth in claim 10, wherein the forming the patterned material on the printing roll includes transcribing a first portion of the pattern material on one of the first printing plate and the second printing plate.

12. The method as set forth in claim 9, wherein the patterned material corresponds to an engraving in one of the first and second printing plates.

13. The method as set forth in claim 9, wherein the transcribed portion of the pattern material forms one of a black matrix pattern, a red color filter pattern, a green color filter pattern, and a blue color filter pattern.

14. A method for forming a liquid crystal display device comprising:
    forming a patterned material on a printing roll using a first printing plate;
    transcribing the patterned material on the printing roll onto a first substrate;
    forming the patterned material on the printing roll using a second printing plate;
    transcribing the patterned material on the printing roll onto a second substrate; and
    washing the first printing plate while forming the patterned material on the printing roll using the second printing plate or transcribing the patterned material on the printing roll onto a second substrate.

15. The method as set forth in claim 14, wherein the forming the patterned material on a printing roll using the first printing plate includes dispensing a pattern material on the printing roll, and transcribing a first portion of the pattern material on the first printing plate.

16. The method as set forth in claim 14, wherein the forming the patterned material on the printing roll using the second printing plate includes dispensing the pattern material on the printing roll, and transcribing a first portion of the pattern material on the second printing plate.

17. The method as set forth in claim 14, wherein the patterned material corresponds to an engraving in one of the first printing plate and the second printing plate.

18. The method as set forth in claim 14, wherein the transcribed portion of the patterned material forms one of a black matrix pattern, a red color filter pattern, a green color filter pattern, and a blue color filter pattern on the first substrate.

* * * * *